March 14, 1961 J. E. MARTENS 2,974,539
MOTION-TRANSMITTING DEVICE
Filed March 14, 1958
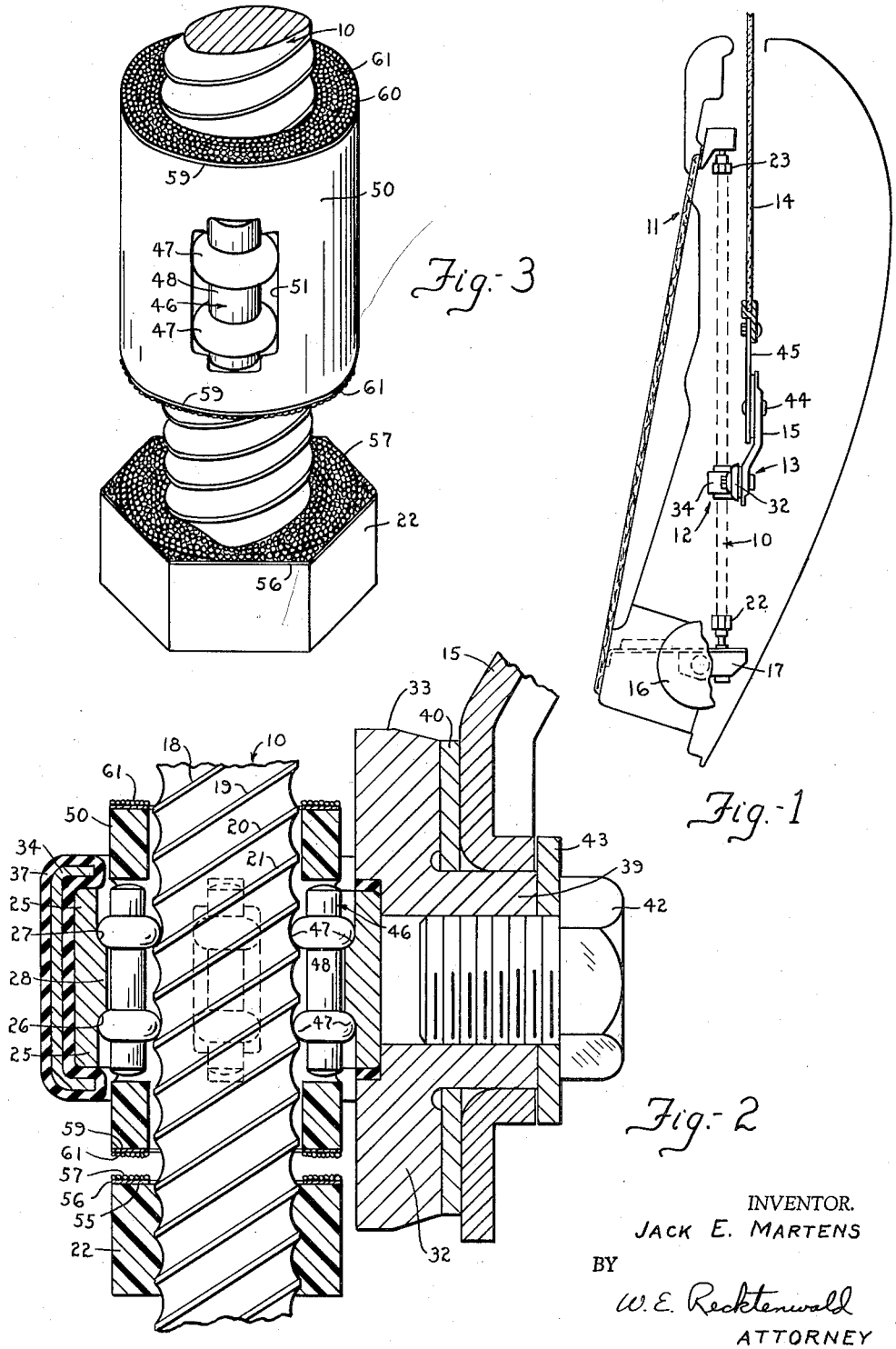
INVENTOR.
JACK E. MARTENS
BY
W. E. Recktenwald
ATTORNEY

United States Patent Office 2,974,539
Patented Mar. 14, 1961

2,974,539
MOTION-TRANSMITTING DEVICE

Jack E. Martens, Gary, Ind., assignor to The Anderson Company, a corporation of Indiana Filed Mar. 14, 1958, Ser. No. 721,460

5 Claims. (Cl. 74—424.8)

This invention relates to a motion-transmitting mechanism and more particularly to an improved nut assembly for operative use on a threaded shaft.

Heretofore, a large number of motion-transmitting mechanisms have been devised, some of which have been tested and marketed wherein a nut member is moved along the axis of a threaded shaft member by rotating one of the members whereupon the other member is caused to move axially relative thereto. All of these devices have been plagued with the problem of creating some means for limiting the axial movement of the nut member relative to the shaft member without damaging either the threaded member or the nut member or without requiring the use of limit switches to deactivate a driving motor so as to stop operation of the device.

Some of these devices use stop pins positioned along the axis of the screw or threaded shaft member, which pins are adapted to engage with one portion of the nut member to freewheel the nut member relative to the screw member. Positioning of the pins on the shaft is both costly and time consuming and not only weakens the threaded shaft member, but also becomes a permanent part of the threaded member which is not susceptible of repair or adjustment in the event it is decided to reposition the stop at some other point along the axis of the threaded member. The use of a pin stop also creates the problem of uneven loading on the carrier of the nut member so that the nut frequently chatters or jams with the resultant damage to the threaded member, the nut and/or the driving motor.

It is, therefore, a principal object of this invention to overcome the above-noted disadvantages and to provide a nut and threaded shaft member having improved freewheeling characteristics.

It is another important object of this invention to provide an improved nut and threaded shaft member having a stop member with novel means for creating a positive freewheeling action between the nut and shaft.

It is a further object of this invention to provide an improved stop means for a threaded shaft member that can be axially adjusted at any position along the shaft without in any way damaging the shaft.

It is a still further object of this invention to provide an improved stop means having a specially constructed contacting face which is adapted to grippingly engage the end of a carrier of a nut member to lock the carrier against further rotation in a particular direction so as to permit freewheeling between the nut member and the threaded shaft member.

It is another object of this invention to provide an improved stop means for a nut-and-screw assembly that is economical to manufacture and install and is readily replaceable without damage to the associated parts of the mechanism.

And it is a still further object of this invention to provide an improved freewheeling device that is highly efficient and simple in its operation having only a few operating parts and is capable of being installed by a person having little mechanical skill.

And yet another object of this invention is to provide an improved movement limiting means that eliminates the need for supplemental stops on the part being actuated.

The above being among the objects of the present invention, the same consists in certain novel features of construction and combinations of parts to be hereinafter described with reference to the accompanying drawing and having the above and other objects in view.

Figure 1 is a side view of a motion-transmitting mechanism in operative relationship with a window-lift mechanism and embodying the features of my invention;

Figure 2 is a vertical cross-sectional view of a nut member and stop means of Figure 1; and Figure 3 is a perspective view of one preferred form of my invention.

The invention as mentioned above may be utilized wherever applicable but, as illustrated in the drawings, is operatively associated with the window of an automotive vehicle.

Referring particularly to Figure 1 of the drawing, there is shown, among other things, a screw or threaded shaft member 10 vertically supported for rotation in a vehicle door 11, a nut assembly generally designated 12 carried by the screw, and connection means 13 operatively connecting the nut assembly with a window 14 through a link 15. A power unit, such as an electric motor 16, shown partially broken away, is operatively connected to the screw through a gear reduction box 17 whereby the screw may be rotated in either a clockwise or counterclockwise direction to cause the nut assembly to travel longitudinally on the shaft.

The screw shown in the drawing is of a multiple-thread type. More particularly, it includes quadruple right-hand threads 18, 19, 20 and 21, which, as shown in the drawings, are produced by any well-known method, such as by rolling or the like. Obviously, there may be any desired number of threads, which may be left-handed without departing from the spirit of the invention. A pair of stop members 22, 23 is secured to the opposite end portions of the shaft in a manner and for a purpose to be described hereinafter.

The nut member generally designated 12 may be constructed in various ways and, as shown in Figures 2 and 3, preferably includes a ring-shaped housing 25 which has formed therein from the opposite open-end portions a pair of oppositely facing raceways or abutments 26, 27. The abutments are formed in such a way as to present a shaped contacting surface in the direction of the respective open end of the housing with a portion 28 of reduced diameter extending in an axial direction between the abutments.

The nut member 12 has a bracket 33 which is comprised of a mounting base 32 secured to a strap member 34 which is shaped to surround the major portion of the circumference of the housing 25. A resilient covering 37 is formed around the strap member 34 so as to cushion the housing 25 from the bracket 33 whereby the operating vibrations and noises of the nut member are substantially reduced.

The bracket 33 has an internally threaded radially extending shank 39 about which is seated both a nylon washer 40 and a shouldered portion of the link 15. Threaded into the shank is a bolt member 42 which positions a washer 43 in overhanging relationship with the shoulder of the link 15 and in spaced relationship with said shoulder so as to provide an operating clearance therebetween. The other end portion of the link 15 is pivoted by a pin 44 to the bracket 45 which is carried by the base of the window 14. The link 15 is adapted to pivot both about the shank 39 and about the pin 44 so as to permit misalignment between the nut assembly and the window 14 without interfering with the operation of the driving mechanism.

A plurality of rotatable bearing elements 46 are interposed between the threads of the shaft member 10 and the raceways 26, 27 of the nut member 12 to adapt the nut and shaft members for relative rotational and longitudinal movement and to transfer or transmit the motion and load or force from the one member to the other. The bearing elements 46 are preferably of the type wherein at least two enlarged bearing surfaces 47 are axially spaced apart along a tubular-shaped member 48 a distance which will substantially coincide with the axial dimension of the portion 28 of the ring-shaped housing so that the bearing surfaces 47 are substantially positioned in contact with the raceways 26, 27. In the form of invention shown in Figure 2, the portion 28 of the nut member is of an axial length such as to require the bearing surfaces 47 of each bearing element 46 to engage with every other one of the threads 18, 19, 20 and 21. An increase or decrease in the number of threads on the shaft member will increase or decrease the number of bearing elements in the particular nut herein described.

Loosely positioned about the threaded shaft 10 and within the ring-shaped housing 25 is a tubular cage member or carrier 50 which has openings 51 within which are nested the bearing elements 46. The openings 51 are formed in the carrier 50 at equally spaced predetermined peripheral positions about the carrier with the long axis of each opening lying substantially parallel to the axis of the carrier. In the form of carrier shown in Figure 2, the short axes of the openings lie in a common plane passing perpendicular to the axis of the carrier.

Although the carrier member 50 may be made of any suitable material, either metal or plastic, it has been found that material of the polyamide types, such as nylon and/or thermosetting plastics, are most satisfactory. The axial extremities of the carrier 50 are substantially flat and lie in parallel planes that are substantially perpendicular to the axis of the screw member.

Rotation of the screw member in either direction rotates the bearing elements 46 about their own axes and also planetates them about the axis of the screw. The planetation causes the bearing elements to roll up or down the spiral surfaces of the screw member. Since the nut member, principally the housing, is not permitted to rotate and since the bearing elements are in rolling contact between the threads and the raceways, the axial movement of the bearing elements along the spiral of the screw will be transmitted to the nut member through the raceways 26 and/or 27. The axial component of force from the screw member and the bearing elements is transmitted to the nut assembly housing through the inner axial portions of the bearing surfaces 47 of the bearing elements to the raceways 26 or 27. The direction the nut member is being moved determines which raceway and bearing surface is carrying the load. For instance, assuming the screw member of Figure 1 to be rotating in a counterclockwise direction, the nut travels in a downward direction along the axis of the screw. The loading is from the screw through the lower bearing surface 47 of the bearing element to the lower raceway 26 through the nut to the window structure. The upper bearing surface 47 is acting as a radial thrust-type bearing with respect to the upper raceway 27 and is transmitting certain tensile forces from the screw through the tubular body 48 of the bearing elements to the lower bearing element 47.

At the opposite extreme end portions of the screw member 10 are secured the stop collars or stop members 22, 23 of which only the lower stop member 22 will be referred to hereinafter since both stop members are substantially identical in design and construction. The illustrated stop collar 22 is formed of a hexagonal-shaped block of solid plastic material, such as nylon, which is bored out in the center in such a way as to permit threading of the block onto the end portions of the screw member 10. By properly proportioning the size of the block relative to the screw member, it is possible to get a tight fit between the two which will in effect lock the stop collar on the screw member. In this way it is possible to move the stop collars to any desired predetermined axial position by gripping the block with a wrench and turning it in the desired direction. The location of the stop is, therefore, very accurate and does not in any way damage the thread or the screw member. It is to be understood that the stop members 22, 23 could be made of metal and could be secured with set screws or clamps without departing from the broad aspect of this invention.

The stop collar 22 has a stopping face 55 which is a planar surface lying substantially in a plane disposed perpendicular to the axis of the screw member 10. Secured to the stopping face 55 of the collar is a ring-shaped strip of cloth or paper 56 that is impregnated on the exposed side with an aggregate 57 such as sand or the like. The stop collar 22, therefore, has a planar stopping face which is coarse in texture and presents a very high frictional drag surface to any moving member coming in contact therewith. It is to be understood to be within the scope of this disclosure that any means for creating a high frictional drag surface on the contacting face 55 of the stop collar is within the scope of this invention. For instance, the aggregate can be embedded or molded into the stop collar during manufacture of the collar, the stop surface 55 could be knurled, or the surface 55 could receive some other means for creating a coarse, high friction-producing surface.

In the illustrated embodiment of my invention the carrier 50 has axially disposed end faces 59, 60 planar in shape and lying in a plane substantially perpendicular to the axis of the screw member 10. A high friction-producing ring of aggregate-type material 61 similar to the high friction-producing surface of the stop collar is secured to the planar faces in such a way as to lie substantially parallel to the planer faces 55 formed on the contacting side of the stop collars 22, 23. It has been found to be satisfactory to eliminate the aggregate on the end faces 59, 60 of the carrier in which case the aggregate on the stop collars 22, 23 create a roughened surface on the end faces 59, 60 after contact so that efficient gripping between the two results.

In operation, for instance, the screw member 10 is rotated in the required direction to lower the window 14 by means of the nut member 12. That is, as the screw member is rotated the bearing elements 46 in the carrier 50 are rotated about their own axes and are planetated with the carrier 50 about the axis of the screw whereupon the nut member is moved down the screw member. When the friction surface 61 on the end face 59 of the carrier 50 engages with the friction surface 57 on the contacting face 55 of the stop collar 22, the carrier 50 is stopped from further planetation about the screw member. Even with the carrier locked from further rotation relative to the screw member, the screw member can still rotate relative to the nut member by means of the rollers partially rotating about their own axis in contact with the raceways 26, 27 and with the threads 18, 19, 20, 21. The high friction surfaces 57 and 61 positively lock the carrier and stop collar together in such a manner as to prevent relative rotation between the carrier and the screw member. The planar contacting surfaces of the stop member and end face of the carrier when in contact create a comparatively evenly and axially directed stopping force that permits continued and smooth freewheeling between the nut and screw. This relatively evenly distributed contacting force overcomes the problem that existed when pin-type stops were used, in that the pin stop exerted a force on the carrier that tended to cant the carrier off axis with the result that the nut chattered relative to the screw or jammed on the screw with the resulting damage to the parts.

The high friction-producing surfaces have the characteristic of positively gripping each other in a comparatively short movement of one relative to the other once contact is established. This short relative movement makes it absolutely certain that the bearing elements will not be forced into a wedged condition relative to the threads of the screw member. That is, in prior devices, when the carrier and stop member continue to slide relative to each other for a considerable distance after the first contact is made between the surfaces, there is a tendency for the bearing surfaces to be forced up the sides of the threads to a point that wedging and chattering results.

In the present device, immediately upon reversing the rotation of the screw member, the nut assembly will be advanced axially of the screw member until the opposite stop 23 is contacted by the other end face 60 of the carrier whereupon substantially the same freewheeling condition prevails.

Having thus described my invention, it is obvious that various other modifications may be made in the same without departing from the spirit of my invention; hence, I do not wish to be understood as limiting myself to the exact forms, constructions, arrangements and combinations of parts herein shown and described or uses mentioned.

I claim:

1. A load-bearing assembly comprising a rotatably mounted screw member, a nut member operatively engaged with said screw member for movement axially thereof, said nut member having a first portion secured against rotation and a second portion rotatable with respect to said first rotatably fixed portion, stop means fixed on said screw member and having a flat face adapted to abut said second rotatable portion of said nut member, and friction-producing means on one of the abuttable faces of said stop means and said second rotatable portion of said nut member for stopping rotation of said second rotatable portion of said nut member.

2. A load-bearing assembly comprising a screw member having threads formed in the peripheral surface thereof, a nut member encircling a portion of said screw member, at least one continuous raceway formed in said nut member, a carrier member rotatably mounted in said nut member and having planar end contact faces, a plurality of bearing elements nested in said carrier member in operative contact with the threads on the screw member and the raceway in the nut member, at least one stop member carried on said screw member with a planar contact face disposed in the direction of the nut member, and friction means on the contact face of said stop member for stopping rotation of said carrier member relative to said screw member upon contact therewith.

3. In a load-bearing assembly in combination with a screw member, a nut member axially movable on said screw member, a rotatable carrier member operatively associated with said nut member and having planar end faces lying in planes substantially perpendicular to the axis of the screw member, means nested in said carrier member in operative contact between the screw member and the nut member, and stop members carried on said screw member in longitudinally spaced-apart relationship, each stop member having a scabrous friction-producing planar contact surface formed thereon and facing in the direction of the nut member, whereby contact between one of said planar contact surfaces and the associated planar end face of said carrier member permits freewheeling of said carrier member relative to said screw member.

4. In a load-bearing assembly in combination with a screw member, a nut member axially movable on said screw member, a freely rotatable carrier member operatively associated with said nut member, roller means nested in said carrier member in operative contact between the screw member and the nut member, and at least one stop member fixed on said screw member and having a planar contact face infused with particles of high friction material facing in the direction of the nut member, whereby contact between said planar contact face and a planar end face of said carrier member stops rotation of said carrier member relative to said screw member.

5. In a load-bearing assembly in combination with a screw member, a nut member axially movable on said screw member and comprising a housing, a freely rotatable carrier member positioned in said housing, means nested in said carrier member in operative contact with the screw member and the housing, at least one stop member carried on said screw member with a planar contact surface facing in the direction of the nut member, and means on the contact surface of said stop member for frictionally engaging a planar end face of said carrier member for stopping rotation of said carrier member relative to said screw member whereby the housing of the nut member and the screw member continue to rotate relative to each other.

References Cited in the file of this patent

UNITED STATES PATENTS

| | | |
|---|---|---|
| 2,124,037 | Lavigne | July 19, 1938 |
| 2,701,478 | Riess | Feb. 8, 1955 |
| 2,714,005 | Wise | July 26, 1955 |
| 2,731,261 | Drum | Jan. 17, 1956 |
| 2,741,340 | Newell | Apr. 10, 1956 |
| 2,756,991 | Busdiecker | July 31, 1956 |
| 2,768,532 | Russell | Oct. 30, 1956 |
| 2,788,829 | Edwards | Apr. 16, 1957 |